(12) United States Patent
Hecht et al.

(10) Patent No.: US 10,576,880 B1
(45) Date of Patent: Mar. 3, 2020

(54) USING AN EXTERNAL VEHICLE DISPLAY FOR VEHICLE COMMUNICATION

(71) Applicant: GM GLOBAL TECHNOLOGY OPERATIONS LLC, Detroit, MI (US)

(72) Inventors: Ron M. Hecht, Raanana (IL); Asaf Degani, Tel Aviv (IL); Ariel Telpaz, Givat Haim Meuhad (IL); Eilon Riess, Zikron-Yaakov (IL); Yael Shmueli Friedland, Tel Aviv (IL); Gila Kamhi, Zichron-Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/242,547

(22) Filed: Jan. 8, 2019

(51) Int. Cl.
*B60Q 1/50* (2006.01)
*G07C 5/00* (2006.01)

(52) U.S. Cl.
CPC ............ *B60Q 1/503* (2013.01); *G07C 5/008* (2013.01)

(58) Field of Classification Search
CPC ................................ B60Q 1/503; G07C 5/008
USPC ....................................................... 340/425.5
See application file for complete search history.

(56) References Cited

U.S. PATENT DOCUMENTS

| | | | |
|---|---|---|---|
| 7,221,363 B2* | 5/2007 | Roberts | B60Q 9/00 345/204 |
| 9,035,760 B2* | 5/2015 | Reilhac | B60Q 9/004 180/271 |
| 9,830,757 B2* | 11/2017 | Weicker | G07C 9/00039 |
| 9,855,890 B2* | 1/2018 | James | B60Q 1/503 |
| 10,346,119 B2* | 7/2019 | LeBlanc | G06F 3/1431 |
| 2018/0115898 A1* | 4/2018 | Han | G01S 5/00 |

* cited by examiner

*Primary Examiner* — John A Tweel, Jr.
(74) *Attorney, Agent, or Firm* — Cantor Colburn LLP

(57) ABSTRACT

Examples of techniques for vehicle communication between a first vehicle and a second vehicle are disclosed. An example method includes displaying, on an external vehicle display of the first vehicle, vehicle data. The method further includes capturing, by a camera of the second vehicle, an image of the external vehicle display. The method further includes processing, by a processing device associated with the second vehicle, the image to extract the vehicle data about the first vehicle. The method further includes determining, by the processing device, a position of the first vehicle relative to a position of the second vehicle based at least in part on the vehicle data. The method further includes controlling, by the processing device associated with the second vehicle, the second vehicle based at least in part on the position of the first vehicle relative to the position of the second vehicle.

20 Claims, 8 Drawing Sheets

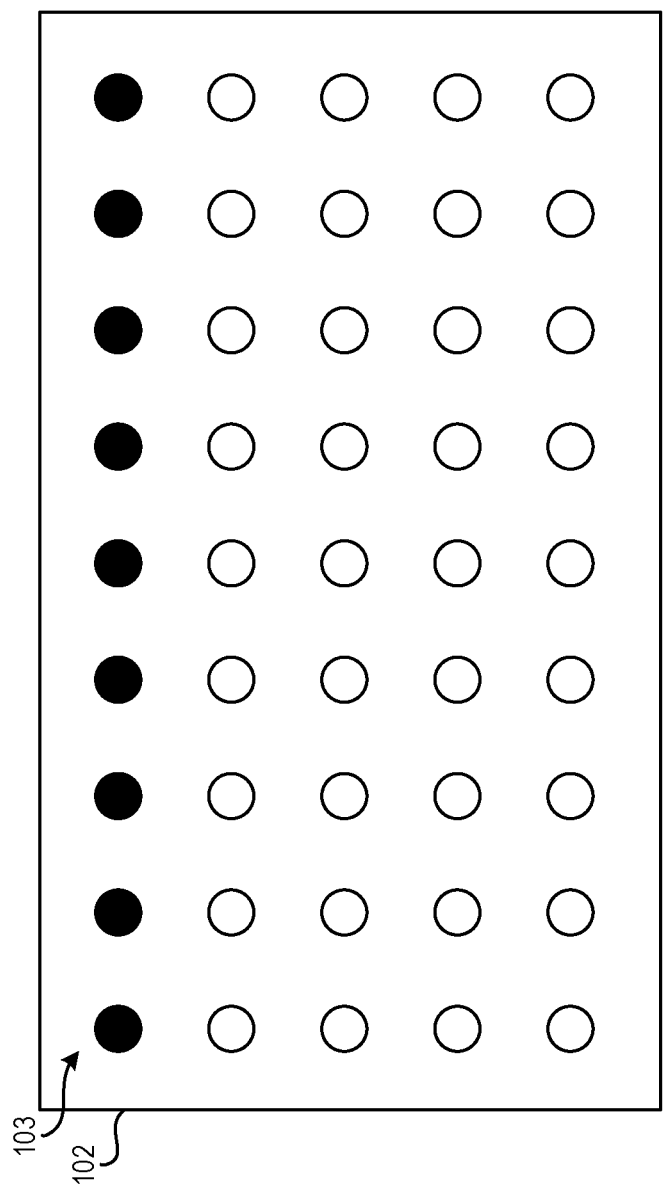

USING AN EXTERNAL VEHICLE DISPLAY FOR VEHICLE COMMUNICATION

INTRODUCTION

The present disclosure relates to using an external vehicle display for vehicle communication.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method for using an external vehicle display for vehicle communication between a first vehicle and a second vehicle is provided. The method includes displaying, on an external vehicle display of the first vehicle, vehicle data about the first vehicle. The method further includes capturing, by a camera of the second vehicle, an image of the external vehicle display of the first vehicle. The method further includes processing, by a processing device associated with the second vehicle, the image to extract the vehicle data about the first vehicle. The method further includes determining, by the processing device associated with the second vehicle, a position of the first vehicle relative to a position of the second vehicle based at least in part on the vehicle data about the first vehicle. The method further includes controlling, by the processing device associated with the second vehicle, the second vehicle based at least in part on the position of the first vehicle relative to the position of the second vehicle.

In additional examples, the external vehicle display includes a plurality of light emitting diodes (LEDs), wherein a first subset of the plurality of LEDs displays a human-recognizable image, and wherein a second subset of the plurality of LEDs displays the vehicle data about the first vehicle. In additional examples, the plurality of LEDs are arranged in a plurality of rows and a plurality of columns. In additional examples, the second subset of the plurality of LEDs is one of the rows of the plurality of rows or one of the columns of the plurality of columns. In additional examples, the second subset of the plurality of LEDs each display a plurality of colors, wherein each of the plurality of colors is associated with a bit of data. In additional examples, displaying, on the external vehicle display of the first vehicle, further includes displaying a human-recognizable image on the external vehicle display of the first vehicle, wherein the human-recognizable image is displayed at a first frequency in frames per second, and wherein the vehicle data are displayed at a second frequency in frames per second. In additional examples, the second frequency of the data is not detectable to a human. In additional examples, the vehicle data are displayed intermittently with respect to a human recognizable image. In additional examples, the method further includes transmitting, by the processing device of the second vehicle, an acknowledgement to a processing device of the first vehicle.

In another exemplary embodiment a system includes a memory having computer readable instructions and a processing device for executing the computer readable instructions for performing a method for using an external vehicle display for vehicle communication between a first vehicle and a second vehicle, the processing device being associated with the second vehicle. The method includes displaying, on the external vehicle display of the first vehicle, a human-recognizable image and vehicle data about the first vehicle. The method further includes capturing, by a camera of the second vehicle, an image of the external vehicle display of the first vehicle. The method further includes processing, by the processing device associated with the second vehicle, the image to extract the vehicle data about the first vehicle. The method further includes determining, by the processing device associated with the second vehicle, a position of the first vehicle relative to a position of the second vehicle based at least in part on the vehicle data about the first vehicle. The method further includes controlling, by the processing device associated with the second vehicle, the second vehicle based at least in part on the position of the first vehicle relative to the position of the second vehicle.

In additional examples, the external vehicle display includes a plurality of light emitting diodes (LEDs), wherein a first subset of the plurality of LEDs displays the human-recognizable image, and wherein a second subset of the plurality of LEDs displays the vehicle data about the first vehicle. In additional examples, the plurality of LEDs are arranged in a plurality of rows and a plurality of columns. In additional examples, the second subset of the plurality of LEDs is one of the rows of the plurality of rows or one of the columns of the plurality of columns. In additional examples, the second subset of the plurality of LEDs each display a plurality of colors, wherein each of the plurality of colors is associated with a bit of data. In additional examples, the human-recognizable image is displayed at a first frequency in frames per second, and the vehicle data are displayed at a second frequency in frames per second. In additional examples, the second frequency of the data is not detectable to a human. In additional examples, the vehicle data are displayed intermittently with respect to the human recognizable image. In additional examples, the method further includes transmitting, by the processing device of the second vehicle, an acknowledgement to a processing device of the first vehicle.

In yet another exemplary embodiment a computer program product includes a computer readable storage medium having program instructions embodied therewith, wherein the computer readable storage medium is not a transitory signal per se, the program instructions executable by a processing device to cause the processing device to perform a method for using an external vehicle display for vehicle communication between a first vehicle and a second vehicle, the processing device being associated with the second vehicle. The method includes displaying, on the external vehicle display of the first vehicle, a human-recognizable image and vehicle data about the first vehicle. The method further includes capturing, by a camera of the second vehicle, an image of the external vehicle display of the first vehicle. The method further includes processing, by the processing device associated with the second vehicle, the image to extract the vehicle data about the first vehicle. The method further includes determining, by the processing device associated with the second vehicle, a position of the first vehicle relative to a position of the second vehicle based at least in part on the vehicle data about the first vehicle. The method further includes controlling, by the processing device associated with the second vehicle, the second vehicle based at least in part on the position of the first vehicle relative to the position of the second vehicle.

In additional examples, the external vehicle display includes a plurality of light emitting diodes (LEDs), wherein a first subset of the plurality of LEDs displays the human-recognizable image, and wherein a second subset of the plurality of LEDs displays the vehicle data about the first vehicle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 3B depicts an external vehicle display according to one or more embodiments described herein;

DETAILED DESCRIPTION

Figure 1A:
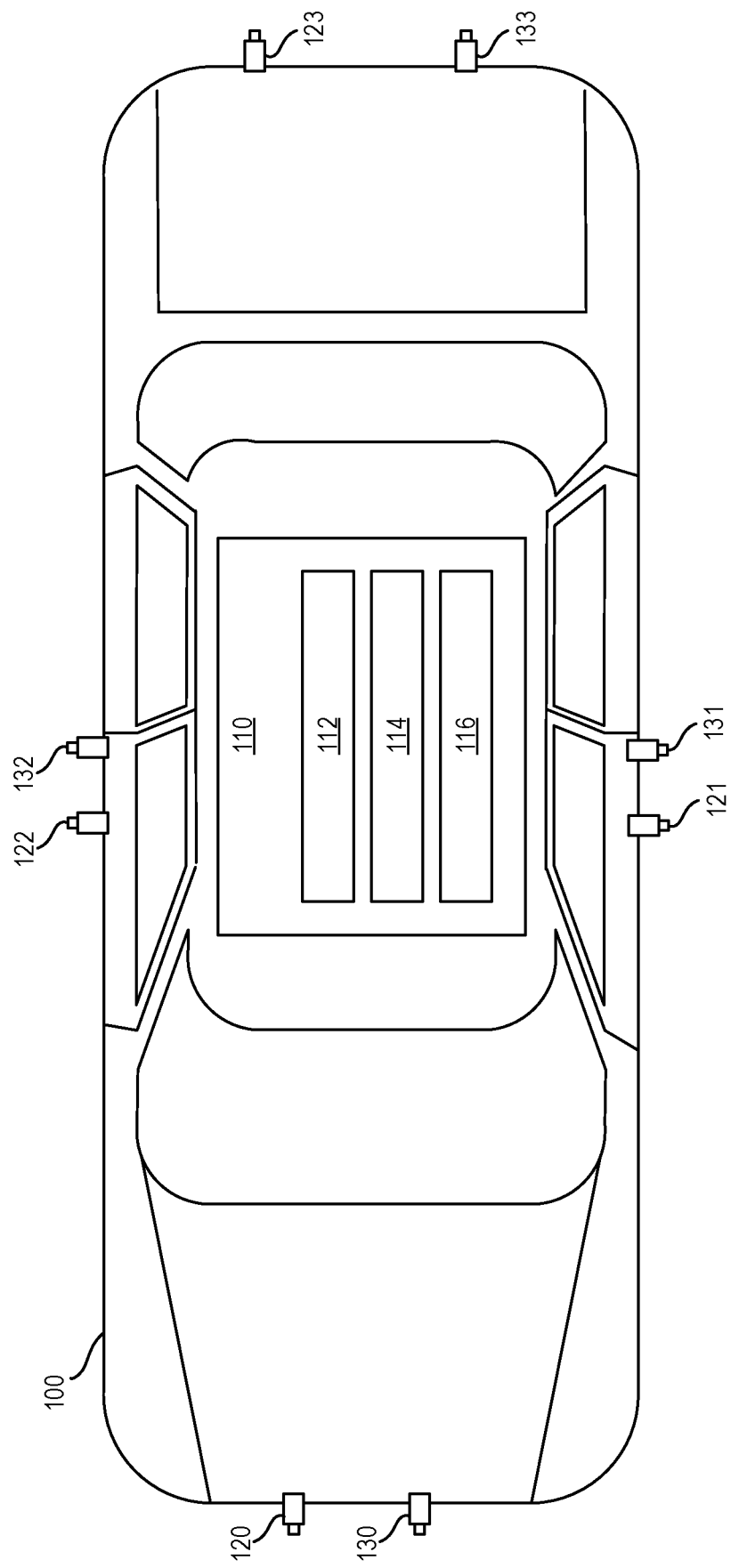
FIG. 1A depicts a vehicle including cameras and a processing system for using an external vehicle display for vehicle communication according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for using an external vehicle display for vehicle communication between a first vehicle and a second vehicle. Vehicles, especially autonomous and/or semi-autonomous vehicles, may determine the location of other vehicles nearby. For example, a primary vehicle can detect other vehicles (target vehicles) using cameras on the primary vehicle. Vehicles often implement multiple cameras to capture images external to the vehicle, such as for object detection, collision avoidance, autonomous operation, etc. or to provide information to a driver/operator of the vehicle. A vehicle can be equipped with various types of cameras (e.g., long-range cameras, surround view cameras, etc.) of different numbers (e.g., one camera per side/end, two cameras per side/end). Images captured from the cameras of the primary vehicle that show target vehicles need to be aligned with data received from target vehicles to determine the location of the target vehicles. To do this, target vehicles typically transmit data, such as using WiFi, dedicated short-range communication (DSRC), Bluetooth, etc., to the primary vehicle (and other target vehicles) that provide the target vehicle's GPS coordinates.

When an image is observed from the primary vehicle of a target vehicle, the primary vehicle must align or associate the data received from the target vehicle with the image captured by the primary vehicle. A typical example of how this is accomplished is as follows. Vehicle A sends a bit of data X plus location information to Vehicle B, which receives this information. Vehicle B then determines Vehicle B's location using a global positioning system (GPS) module and/or inertial measurement unit (IMU) module in Vehicle B. Vehicle B also records an image(s) using its camera(s) and detects the Vehicle A in that image(s). Based on Vehicle B's position and detection, Vehicle B assigns a location to the Vehicle A. To do this, Vehicle B locates the Vehicle A described in the data among other vehicles detected in the image, and bit X is associated with the correct vehicle. This procedure can cause inaccuracies between the location data received and the identified vehicle. For example, it is possible that the vehicle detected in the image is incorrectly associated with location data (e.g., the location data for another vehicle is incorrectly associated with the vehicle detected in the image). Further, this procedure requires that the primary vehicle (e.g., Vehicle A) include a GPS and/or IMU.

To solve this problem, the present techniques improve vehicle detection technologies by transmitting vehicle location data from a target vehicle using an external vehicle display that is detected by a camera on a primary vehicle. For example, one or more LEDs of the external vehicle display can be allocated to transmit location information to other vehicles. Accordingly, when a primary vehicle captures an image of the target vehicle and its external vehicle display, the primary vehicle can extract the location information from the image. No association between received data (e.g., data received over another communication interface) and image data is necessary. Accordingly, the present techniques use hardware that occupies less space (i.e., is smaller) than existing approaches because less hardware is needed.

FIG. 1A depicts a second vehicle 100 including cameras and a processing system for using an external vehicle display for vehicle communication according to one or more embodiments described herein. In particular, the second vehicle 100 may include the processing system 110, cameras 120, 121, 122, 123, and cameras 130, 131, 132, 133. The vehicle 100 may be a car, truck, van, bus, motorcycle, boat, plane, submarine, or another suitable vehicle 100.

The cameras 120-123 are surround view cameras that capture images external to, and in near proximity to, the second vehicle 100. The images captured by the cameras 120-123 together form a surround view (sometimes referred to as a "top-down view" or a "bird's eye view") of the second vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The processing system 110 includes an image processing engine 112, a positioning engine 114, and a vehicle controlling engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like. The features and functionality of the components of the processing system 110 are described further below.

Figure 1B:
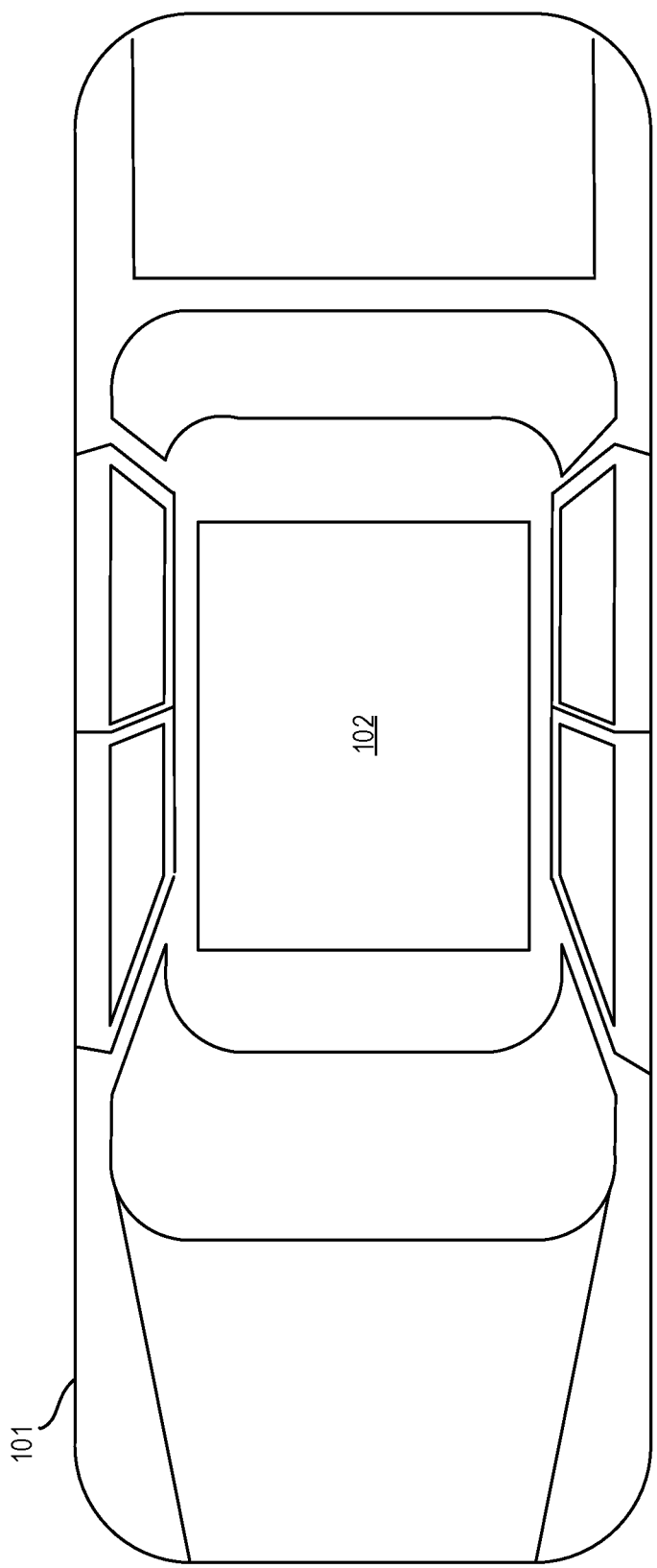
FIG. 1B depicts a vehicle including an external vehicle display for vehicle communication according to one or more embodiments described herein.

FIG. 1B depicts a vehicle 101 that includes an external vehicle display 102 according to one or more embodiments described herein. The external vehicle display 102 can be any suitable device for displaying text, images, etc., such as a light emitting diode (LED) display or other suitable display. The external vehicle display 102 may be mounted or affixed to the vehicle 101 and/or placed within the vehicle 101. The term "external" in external vehicle display 102 describes that content displayed on the display is visible external to the vehicle 101, such as by a human, a camera, etc., external from the vehicle 101. Although not shown, the vehicle 101 can include other components, such as a processing system, a global positioning system (GPS) module, an inertial measurement unit (IMU) module, a camera or cameras, and/or other modules, components, etc.

Figure 1C:
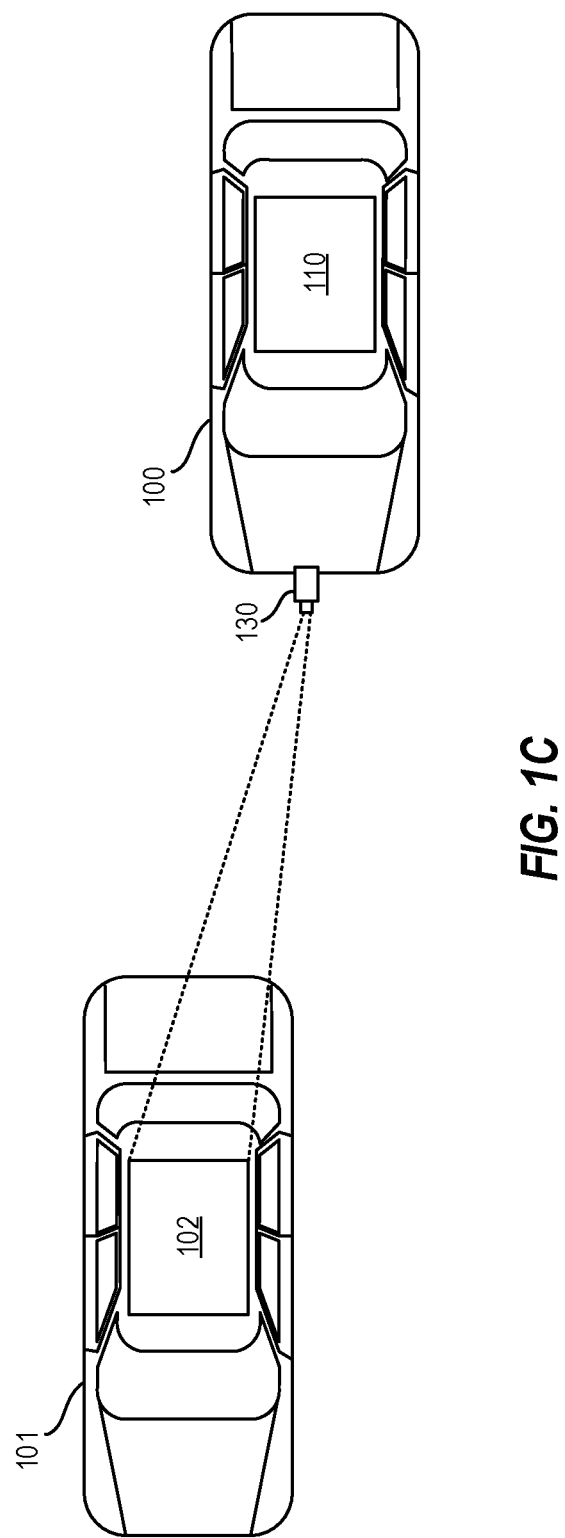
FIG. 1C depicts the vehicles of FIGS. 1A and 1B according to one or more embodiments described herein.

FIG. 1C depicts the vehicles of FIGS. 1A and 1B according to one or more embodiments described herein. In this example, the camera 130 of the vehicle 100 captures an image of the vehicle 101 including the external vehicle display 102. Using the image, the processing system 110 of the vehicle 100 can extract vehicle data from the external vehicle display 102 to determine a relative location of the vehicle 101 relative to the vehicle 100. This process is described further with reference to FIG. 2.

Figure 2:
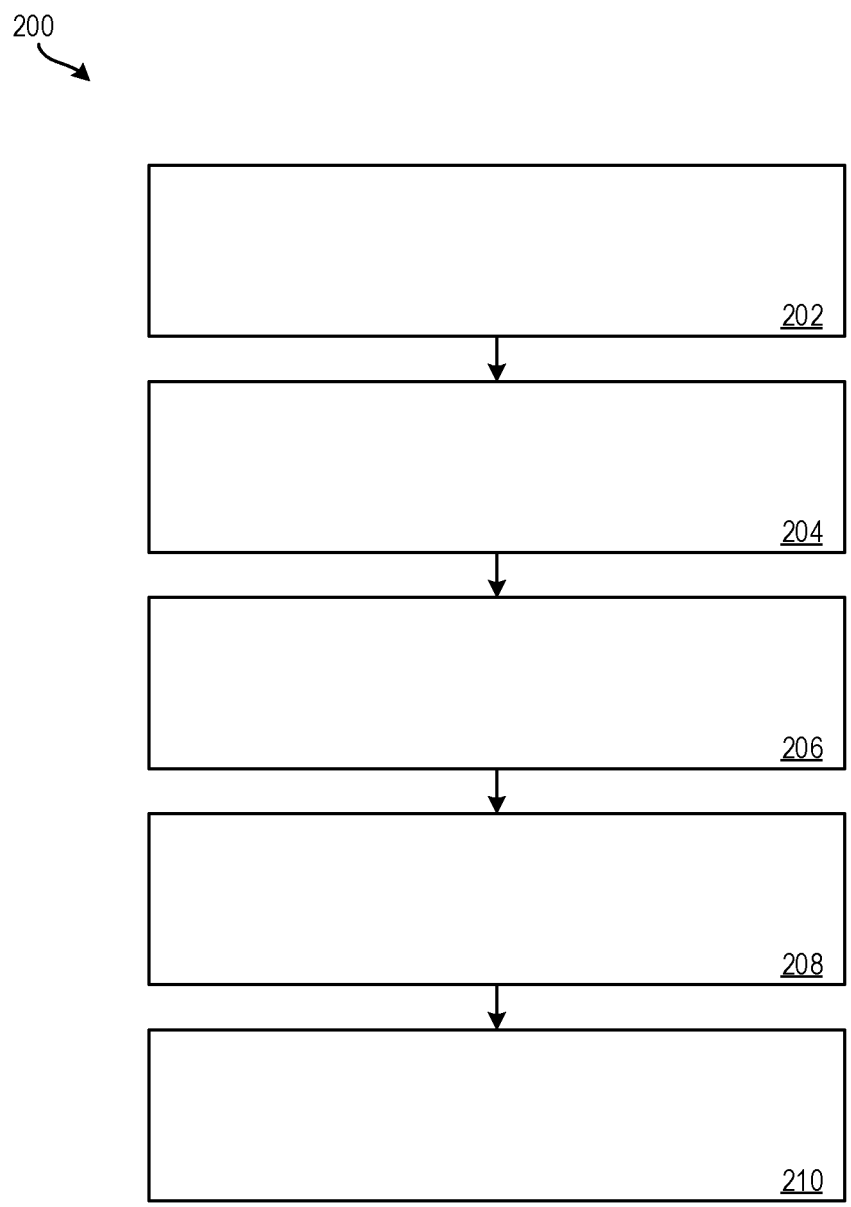
FIG. 2 depicts a flow diagram of a method for using an external vehicle display for vehicle communication according to one or more embodiments described herein.

In particular, FIG. 2 depicts a flow diagram of a method 200 for using an external vehicle display for vehicle communication according to one or more embodiments described herein. For example, the method 200 can be used to facilitate vehicle communication between the second vehicle 100 and the first vehicle 101. The method 200 can be performed by any suitable system or device such as the processing system 110 of FIG. 1, the processing system 400 of FIG. 4, or any other suitable processing system and/or processing device (e.g., a processor).

The method includes, at block 202, displaying, on the external vehicle display 102 of the first vehicle (e.g., the first vehicle 101), vehicle data about the first vehicle. A human-recognizable image can also be displayed according to one or more embodiments described herein. The human-recognizable image can include a picture, text, graphics, video, animation, etc., that is recognizable to a user. For example, the external vehicle display 102 can display a name of a passenger/rider to be picked up, an advertisement, occupancy information (e.g., how many empty seats are available), a destination, etc.

Figure 3A:
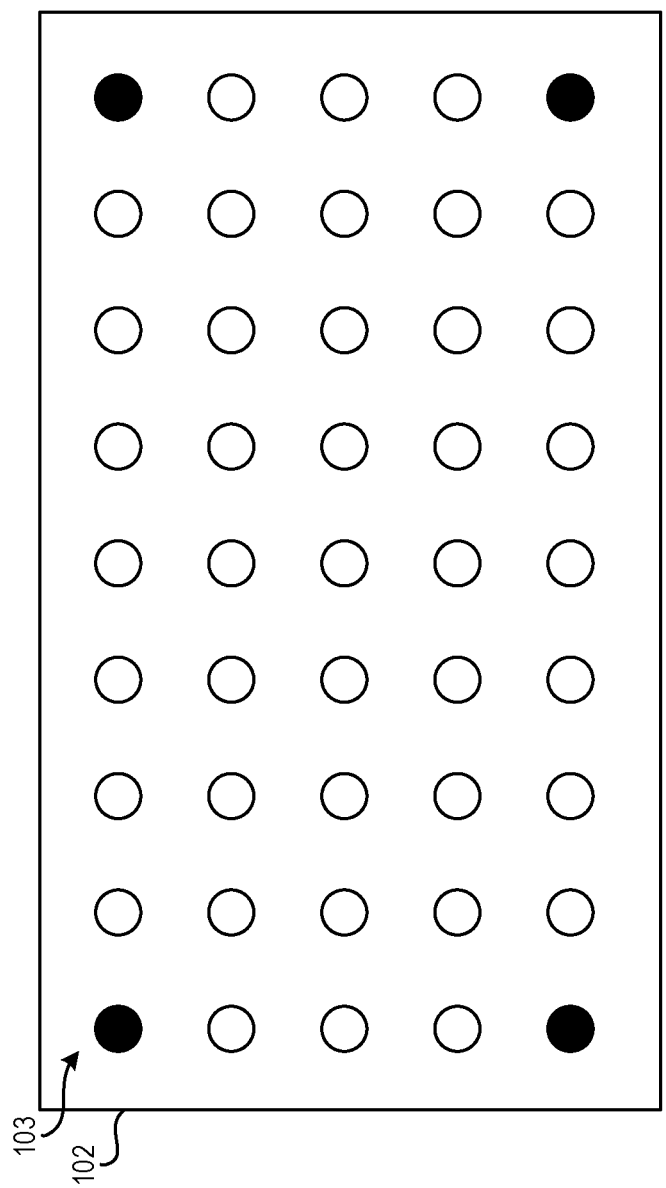
FIG. 3A depicts an external vehicle display according to one or more embodiments described herein.
Figure 3C:
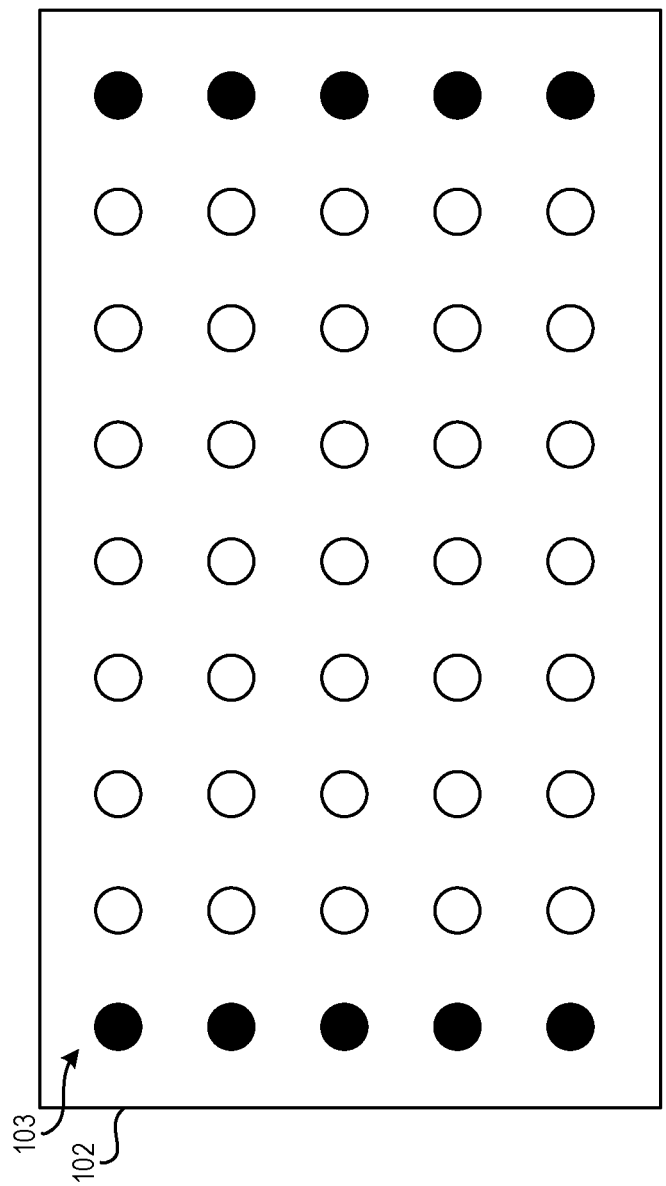
FIG. 3C depicts an external vehicle display according to one or more embodiments described herein.

The external vehicle display 102 can include light emitting diodes (LEDs), for example. According to one or more embodiments described herein, a first subset of the LEDs displays a human-recognizable image (e.g., an image or text), and a second subset of the LEDs displays vehicle data about the vehicle with which the external vehicle display 102 is associated. In examples, the LEDs are arranged in rows and columns. In such cases, the second subset of the LEDs is one of the rows or one of the columns. The LEDs can display different colors in some examples (e.g., red, blue, green, etc.) and each of the colors can be associated with a bit of data (e.g., red=0, blue=1, green=2, etc.). Examples of external vehicle displays are depicted in FIGS. 3A, 3B, and 3C.

In other examples, the human-recognizable image is displayed at a first frequency in frames per second and the vehicle data are displayed at a second frequency in frames per second. This can cause the human-recognizable image to be detectable to human users while the vehicle data are not detectable to the human users and are instead detectable only by cameras (e.g., the cameras 120-123, 130-133). According to one or more embodiments described herein, the vehicle data are displayed intermittently with respect to the human recognizable image. For example, the vehicle data are displayed one time during a period (e.g., 1 second, 5 seconds, 8 seconds, etc.) while the human recognizable image is displayed the remaining time during the period.

The method includes, at block 204, capturing, by the camera 130 of the second vehicle (e.g., the second vehicle 100), an image of the external vehicle display 102 of the first vehicle 101. The image can include an image of the first vehicle 101, including the external vehicle display 102, as well as the area surrounding the first vehicle.

The method includes, at block 206, processing, by the image processing engine 112 of the processing system 110 associated with the second vehicle 100, the image to extract the vehicle data about the first vehicle 101. For example, the image processing engine 112 performs image processing (e.g., feature extraction) on the image captured by the camera to identify the external vehicle display 102 within the image. Next, the image processing engine 112 analyzes the contents of the external vehicle display 102 to detect the vehicle data. This can include recognizing the LEDs dedicated to transmitting the vehicle data (e.g., one of the rows of LEDs, one of the columns of LEDs, etc.), recognizing one of the frames of the image as containing the vehicle data (e.g., 1 frame out of 60 frames per second that include the vehicle data, etc.).

The method includes, at block 208, determining, by the positioning engine 114 of the processing system 110 associated with the second vehicle 100, a position of the first vehicle 101 relative to a position of the second vehicle 100 based at least in part on the vehicle data about the first vehicle 101. For example, the extracted vehicle data provides relative location information for the first vehicle 101. The positioning engine 114 uses the extracted vehicle data to determine the position of the first vehicle 101 relative to the second vehicle 100 (e.g., 50 feet away and 30 degrees to the right (relative to a center line of the second vehicle).

The method includes, at block 210, controlling, by the vehicle controlling engine 116 of the processing system 110 associated with the second vehicle 100, the second vehicle 100 based at least in part on the position of the first vehicle 101 relative to the position of the second vehicle 100. Controlling the second vehicle (e.g., the second vehicle 100) can include increasing/decreasing speed, changing a direction, and the like. For example, if the position of the first vehicle 101 relative to the second vehicle 100 would cause the two vehicles to collide, the vehicle controlling engine 116 can control the second vehicle 100 to avoid the first vehicle 101. This is possible due to determining the position of the first vehicle 101 relative to the second vehicle 100 using the vehicle data extracted from the image captured of the external vehicle display 102. Accordingly, vehicle technology is improved by controlling the vehicle using such position data.

Additional processes also may be included. For example, the method 200 can further include transmitting, by the processing system 110 of the second vehicle, an acknowledgment to a processing system of the first vehicle. This enables the first vehicle to confirm that the second vehicle successfully received the vehicle data transmitted by the external vehicle display 102. It should be understood that the process depicted in FIG. 2 represents an illustration and that other processes may be added or existing processes may be removed, modified, or rearranged without departing from the scope and spirit of the present disclosure.

FIG. 3A depicts an external vehicle display 102 according to one or more embodiments described herein. In this example, the external vehicle display 102 includes a plurality of LEDs 103 represented as solid and non-solid circles. The solid circles represent LEDs used to transmit vehicle data and the non-solid circles represent LEDs used to transmit a human-human recognizable image. In this example, the LEDs at the four corners of the external vehicle display 102 are dedicated to transmitting vehicle data.

FIG. 3B depicts an external vehicle display 102 according to one or more embodiments described herein. In this example, the external vehicle display 102 includes a plurality of LEDs 103 represented as solid and non-solid circles. The solid circles represent LEDs used to transmit vehicle data and the non-solid circles represent LEDs used to transmit a human-human recognizable image. In this example, the LEDs at a top/first row of the external vehicle display 102 are dedicated to transmitting vehicle data.

FIG. 3C depicts an external vehicle display 102 according to one or more embodiments described herein. In this example, the external vehicle display 102 includes a plurality of LEDs 103 represented as solid and non-solid circles. The solid circles represent LEDs used to transmit vehicle data and the non-solid circles represent LEDs used to transmit a human-human recognizable image. In this example, the LEDs at of a first/left and a last/right column of the external vehicle display 102 are dedicated to transmitting vehicle data.

It should be appreciated that configurations other than those depicted in FIGS. 3A-3C are possible in keeping with the scope of one or more embodiments described herein.

Figure 4:
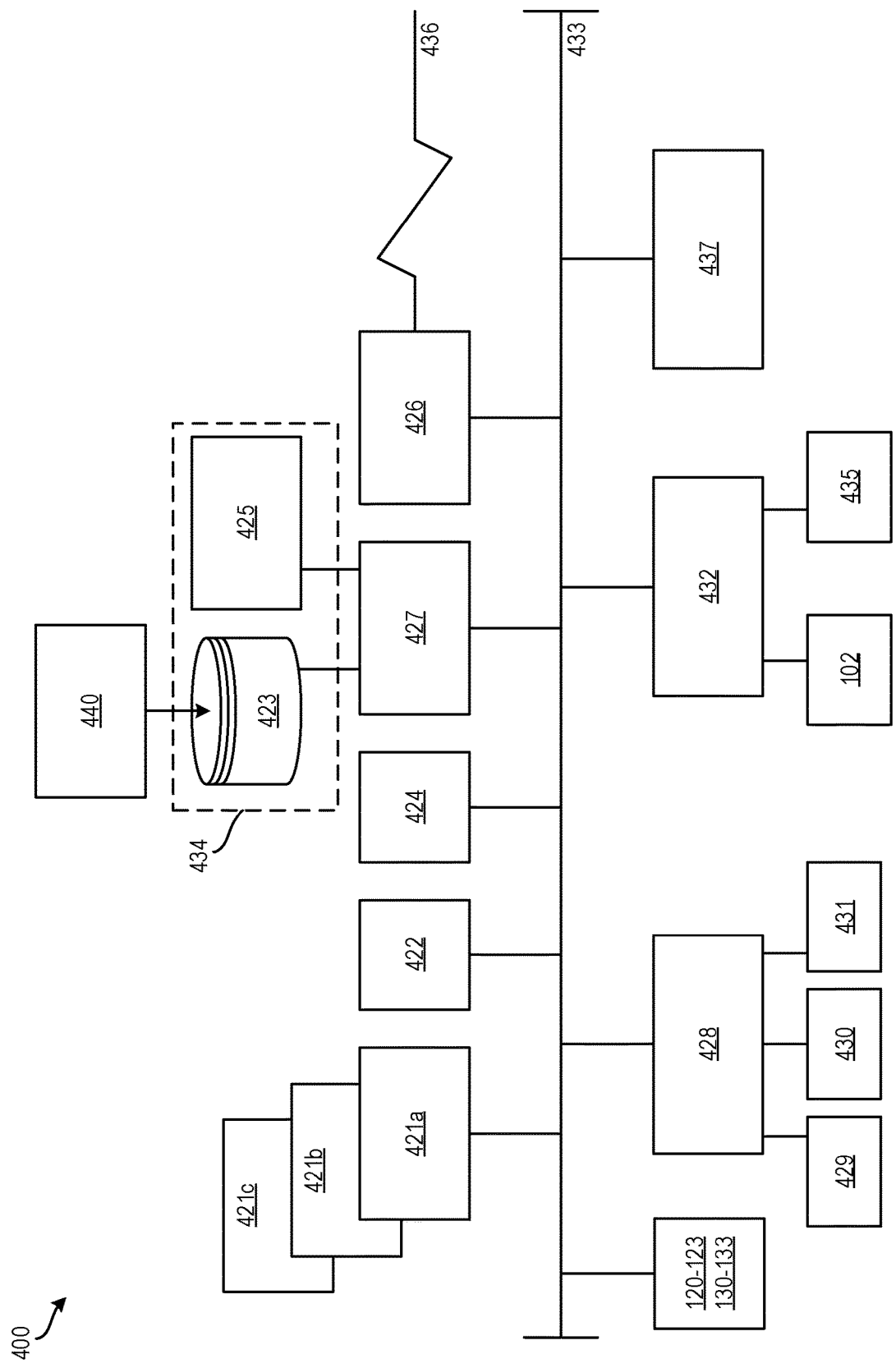
FIG. 4 depicts a block diagram of a processing system for implementing the techniques described herein according to an exemplary embodiment.

It is understood that the present disclosure is capable of being implemented in conjunction with any other type of computing environment now known or later developed. For example, FIG. 4 depicts a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. The external vehicle display 102 may also be connected to the display adapter 432. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit. One or more of the cameras 120-123, 130-133 are also connected to the system bus 433.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for using an external vehicle display for vehicle communication between a first vehicle and a second vehicle, the method comprising:
   displaying, on the external vehicle display of the first vehicle, vehicle data about the first vehicle;
   capturing, by a camera of the second vehicle, an image of the external vehicle display of the first vehicle;
   processing, by a processing device associated with the second vehicle, the image to extract the vehicle data about the first vehicle;
   determining, by the processing device associated with the second vehicle, a position of the first vehicle relative to a position of the second vehicle based at least in part on the vehicle data about the first vehicle; and
   controlling, by the processing device associated with the second vehicle, the second vehicle based at least in part on the position of the first vehicle relative to the position of the second vehicle.

2. The computer-implemented method of claim 1, wherein the external vehicle display comprises a plurality of light emitting diodes (LEDs), wherein a first subset of the plurality of LEDs displays a human-recognizable image, and wherein a second subset of the plurality of LEDs displays the vehicle data about the first vehicle.

3. The computer-implemented method of claim 2, wherein the plurality of LEDs are arranged in a plurality of rows and a plurality of columns.

4. The computer-implemented method of claim 3, wherein the second subset of the plurality of LEDs is one of the rows of the plurality of rows or one of the columns of the plurality of columns.

5. The computer-implemented method of claim 2, wherein the second subset of the plurality of LEDs each display a plurality of colors, wherein each of the plurality of colors is associated with a bit of data.

6. The computer-implemented method of claim 1, wherein the displaying, on the external vehicle display of the first vehicle, further comprises displaying a human-recognizable image on the external vehicle display of the first vehicle, wherein the human-recognizable image is displayed at a first frequency in frames per second, and wherein the vehicle data are displayed at a second frequency in frames per second.

7. The computer-implemented method of claim 6, wherein the second frequency of the data is not detectable to a human.

8. The computer-implemented method of claim 1, wherein the vehicle data are displayed intermittently with respect to a human recognizable image.

9. The computer-implemented method of claim 1, further comprising:
   transmitting, by the processing device of the second vehicle, an acknowledgement to a processing device of the first vehicle.

10. A system comprising:
    a memory comprising computer readable instructions; and
    a processing device for executing the computer readable instructions for performing a method for using an external vehicle display for vehicle communication between a first vehicle and a second vehicle, the processing device being associated with the second vehicle, the method comprising:
      displaying, on the external vehicle display of the first vehicle, a human-recognizable image and vehicle data about the first vehicle;
      capturing, by a camera of the second vehicle, an image of the external vehicle display of the first vehicle;
      processing, by the processing device associated with the second vehicle, the image to extract the vehicle data about the first vehicle;
      determining, by the processing device associated with the second vehicle, a position of the first vehicle relative to a position of the second vehicle based at least in part on the vehicle data about the first vehicle; and
      controlling, by the processing device associated with the second vehicle, the second vehicle based at least in part on the position of the first vehicle relative to the position of the second vehicle.

11. The system of claim 10, wherein the external vehicle display comprises a plurality of light emitting diodes (LEDs), wherein a first subset of the plurality of LEDs displays the human-recognizable image, and wherein a second subset of the plurality of LEDs displays the vehicle data about the first vehicle.

12. The system of claim 11, wherein the plurality of LEDs are arranged in a plurality of rows and a plurality of columns.

13. The system of claim 12, wherein the second subset of the plurality of LEDs is one of the rows of the plurality of rows or one of the columns of the plurality of columns.

14. The system of claim 11, wherein the second subset of the plurality of LEDs each display a plurality of colors, wherein each of the plurality of colors is associated with a bit of data.

15. The system of claim 10, wherein the human-recognizable image is displayed at a first frequency in frames per second, and wherein the vehicle data are displayed at a second frequency in frames per second.

16. The system of claim 15, wherein the second frequency of the data is not detectable to a human.

17. The system of claim 10, wherein the vehicle data are displayed intermittently with respect to the human recognizable image.

18. A computer program product comprising:
a computer readable storage medium having program instructions embodied therewith, the program instructions executable by a processing device to cause the processing device to perform a method for using an external vehicle display for vehicle communication between a first vehicle and a second vehicle, the processing device being associated with the second vehicle, the method comprising:
- displaying, on the external vehicle display of the first vehicle, a human-recognizable image and vehicle data about the first vehicle;
- capturing, by a camera of the second vehicle, an image of the external vehicle display of the first vehicle;
- processing, by the processing device associated with the second vehicle, the image to extract the vehicle data about the first vehicle;
- determining, by the processing device associated with the second vehicle, a position of the first vehicle relative to a position of the second vehicle based at least in part on the vehicle data about the first vehicle; and
- controlling, by the processing device associated with the second vehicle, the second vehicle based at least in part on the position of the first vehicle relative to the position of the second vehicle.

19. The computer program product of claim 18, wherein the external vehicle display comprises a plurality of light emitting diodes (LEDs), wherein a first subset of the plurality of LEDs displays the human-recognizable image, and wherein a second subset of the plurality of LEDs displays the vehicle data about the first vehicle.

20. The computer program product of claim 18, wherein the vehicle data are displayed intermittently with respect to the human recognizable image.

* * * * *